Figure 1:
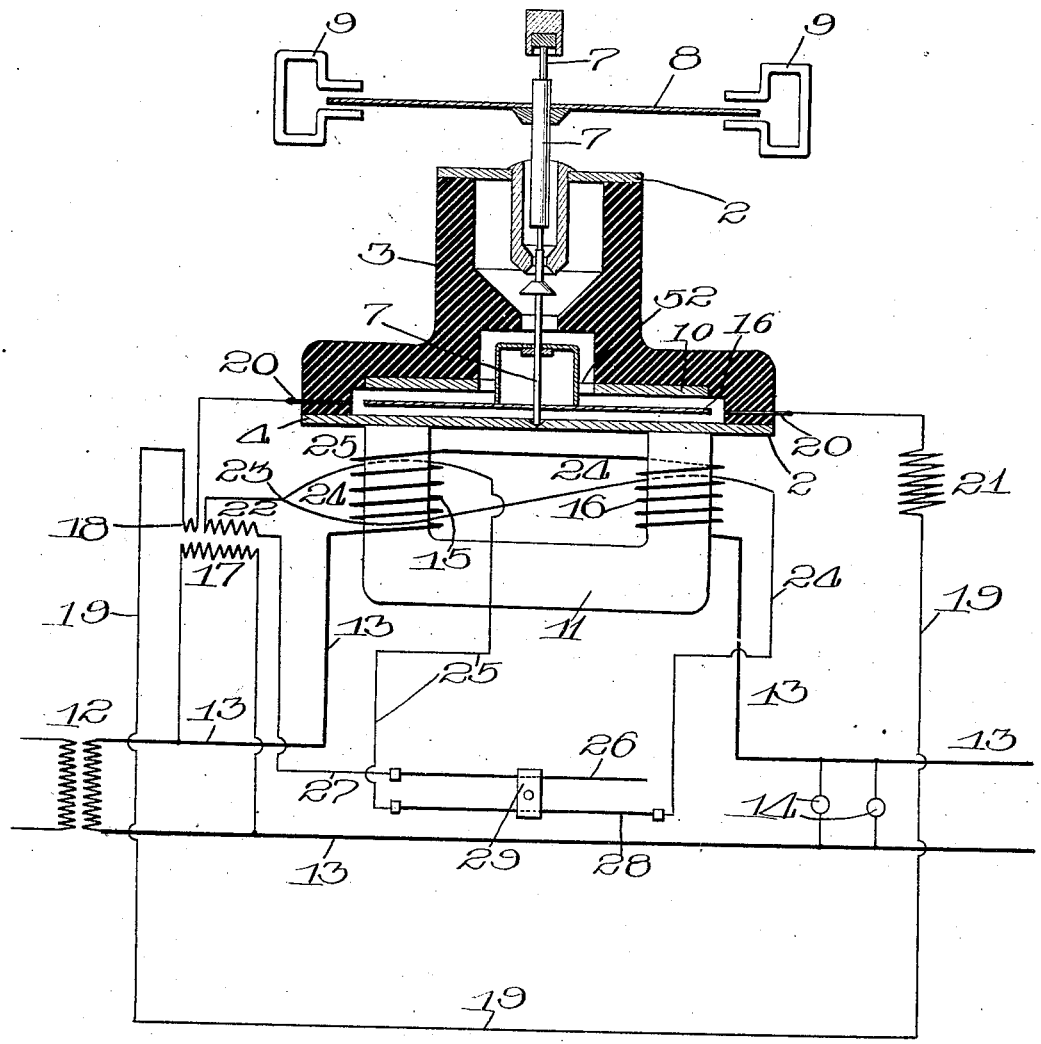

R. C. LANPHIER & J. H. HODDE.
MOTOR METER FOR ALTERNATING CURRENTS.
APPLICATION FILED JULY 6, 1908.

910,550.

Patented Jan. 26, 1909.

Witnesses:

Inventors:
Robert C. Lanphier
Jacob H. Hodde
Burns Adams Pickard Jackson
Attys

UNITED STATES PATENT OFFICE.

ROBERT C. LANPHIER AND JACOB H. HODDE, OF SPRINGFIELD, ILLINOIS, ASSIGNORS TO SANGAMO ELECTRIC COMPANY, OF SPRINGFIELD, ILLINOIS, A CORPORATION OF ILLINOIS.

MOTOR-METER FOR ALTERNATING CURRENTS.

No. 910,550.  Specification of Letters Patent.  Patented Jan. 26, 1909.

Application filed July 6, 1908. Serial No. 442,101.

*To all whom it may concern:*

Be it known that we, ROBERT C. LANPHIER and JACOB H. HODDE, citizens of the United States, residing at Springfield, in the county of Sangamon and State of Illinois, have invented certain new and useful Improvements in Motor-Meters for Alternating Currents, of which the following is a specification, reference being had to the accompanying drawing.

Our invention relates to improved motor meters of the mercury type for alternating currents, and particularly to improvements in the meter shown and described in Letters Patent to Robert C. Lanphier, No. 843,155, of February 5, 1907, and its principal object is to provide a new and improved mechanism for overcoming or compensating initial friction so that the meter may run accurately on very light load.

In the mercury meter shown in the Letters Patent to Lanphier above referrrd to, the torque or rotative effect is produced by the action of a magnetic field varying with the load current upon a large volume of current passing across the armature and derived from the secondary of a low potential step-down transformer whose primary is connected across the main circuit. In the meter shown in that patent, devices for initial friction compensation are shown, and which consist of an auxiliary secondary circuit derived from the transformer whose main secondary winding energizes the disk circuit and having in series with it several auxiliary turns around the magnet and an adjustable resistance whereby the amount of current required for initial or light load compensation may be adjusted. One difficulty with this style of device for compensating for initial friction lies in the fact that a large amount of resistance is required to get a range of compensation extending from the desired maximum to a very low value. If, therefore, a meter should be adjusted to a given voltage,—say 110 volts—so as to have initial friction properly compensated to give the meter accurate results on a light load, this meter would probably be too fast in case there was a considerable rise in the voltage and would "creep on no load" as it is termed. This form of device is then likely to make it difficult to reduce the compensating effect as desired.

The object of our present invention is to provide a new and improved device which will overcome these difficulties and provide a mechanism by which the initial friction may be very exactly compensated.

In the drawing:—the figure represents a meter in vertical section, showing the circuits and windings diagrammatically, and having the time-train and casing omitted for clearness of illustration.

Referring to the drawing:—2 indicates the body or chamber-casing of the meter which is formed preferably of a body portion 3 of insulating material and a bottom plate 4 of non-magnetic material, so shaped as to inclose a chamber 5 adapted to contain mercury and within which revolves a disk 6 mounted on a spindle 7 and provided with a brake disk 8 and braking magnets 9, and return plate 10, all of which are of the well-known and approved form and construction.

11 indicates a U-shaped magnet of soft iron, preierably formed of a number of thin plates  The magnet 11 is secured below the plate 4 in any well-known manner.

12 indicates the supply transformer of the system to which the meter is connected.

13 indicates the main load circuit, and 14 the translating devices in the circuit.

15—16 indicate windings which pass in opposite directions around the two vertical portions of the U-shaped magnet 11 and are connected in series with the load circuit 13.

17 indicates the primary of a low potential step-down transformer which is connected across the main circuit 13.

18 indicates a secondary of the transformer which consists in one or two turns of coarse wire wound around the primary 17 and connected by circuit wires 19 and contacts 20 with the mercury chamber 5 so as to pass the induced current from the secondary 18 through the disk 6.

21 indicates a few turns of inductive winding introduced into the secondary circuit of the transformer in series with the armature and adapted to be varied in any well-known way for the purposes described in the Letters Patent above-named.

The devices so far described operate in the manner set forth in the above-named Letters Patent to Lanphier, and their operation will be readily understood without further explanation here.

22 indicates another secondary winding consisting of a few turns of comparatively large wire around the primary winding 17. The circuit from this transformer divides at 23 into two wires 24—25, each of which passes with one or two turns in relatively opposite directions around one leg of the magnet 11, as is diagrammatically shown in Fig. 1.

26 indicates a bar of metal having high conductivity, to one end of which is connected the wire 27 which passes to the other end of the secondary 22.

28 indicates a bar of resistance metal, to one end of which is connected the wire 24 and to the other end the wire 25.

29 indicates a slide-block of metal of high conductivity which slides upon the bars 26 and 28. It will be obvious that by sliding the slide-block 29 in one direction or the other, the proportion of the resistance metal between the slide-block and the ends to which the wires 24 and 25 are connected will be varied, and thereby the relative amounts of current which pass through the windings on the wires 24 and 25 around the electromagnet will be correspondingly varied. If, for instance, the slide-block is moved as far as possible to the left, the greatest possible amount of current will pass through the winding on the wire 25 and the least possible through the winding on the wire 24, which will cause the maximum magnetization of the magnet and the maximum field, which, coöperating with the current passing across the disk from the secondary of the transformer, will produce a torque in the direction in which the disk is adapted to be driven to measure current. By moving the slide-block in the other direction, the variation between the currents will be lessened until, when the slide-block is at the electrical center of the divided circuit, the currents will exactly balance each other and no magnetization be produced. By moving the slide-block past the electrical center, towards the right, let us suppose, the current in wire 24 will exceed the current in the wire 25 and the reverse magnetic effect and the reverse torque be produced. It is evident from this that a maximum magnetic effect can be produced either in causing rotation forward or backward on low load, and that with the slide-block in intermediate position so that the resistance of the two exciting windings is equal there will be no light load or friction compensating effect. This method of adjustment gives a very wide range so that the meter can be set for any desired voltage without difficulty, and at the same time do away with the necessity for a large amount of resistance in the adjustment to obtain the desired result.

That which we claim as our invention, and desire to secure by Letters Patent, is,—

1. In an alternating current meter having an energizing winding varying with the load current, and an induced low potential current proportionate to the circuit pressure passing through the armature, the combination with the primary of a transformer connected across the load circuit, of a secondary on said transformer, a two-branch circuit leading from said secondary and having auxiliary windings passing around the load exciting magnet in opposite directions, and an adjustable resistance interposed in the circuit of said secondary whereby the volume of current flowing through said divided circuit may be varied.

2. In an alternating current meter having a field energizing winding varying with the load current and an induced low potential current proportionate to the circuit pressure passing through the armature, the combination with a primary transformer connected across the load circuit, of a secondary on said transformer, a circuit from said secondary having two auxiliary exciting windings for the energizing magnet passing around the same in opposite directions, and an adjustable resistance interposed in the said circuit from said secondary whereby the volume of current flowing through the said secondary exciting windings may be respectively varied.

3. In an alternating current meter having an energizing magnet, an energizing winding therefor varying with the load current, an armature, and an induced low potential current proportionate to the circuit pressure and passing through the armature, the combination with a primary transformer connected across the load circuit of a secondary on said transformer, two auxiliary exciting windings passing around said magnet in opposite directions and leading from one end of said secondary, a resistance bar connected near its ends to said auxiliary windings respectively, a second bar of high conductivity adjacent to said resistance bar and connected at one end to the other end of said secondary, and a conductor slide-block connecting said resistance bar and said second bar.

ROBERT C. LANPHIER.
JACOB H. HODDE.

Witnesses:
 FRANK PRIDE,
 ALBERT D. BIRNBAUM.